(12) United States Patent
An et al.

(10) Patent No.: US 12,516,050 B2
(45) Date of Patent: Jan. 6, 2026

(54) METHOD FOR PREPARING ISAVUCONAZONIUM SULFATE

(71) Applicants: SHANGHAI DESANO BIO-PHARMACEUTICAL CO., LTD., Shanghai (CN); SHANGHAI DESANO CHEMICAL PHARMACEUTICAL CO., LTD., Shanghai (CN); SHANGHAI DESANO PHARMACEUTICALS CO., LTD., Shanghai (CN)

(72) Inventors: Xiaoxia An, Shanghai (CN); Nan Zhao, Shanghai (CN); Jiayu Jin, Shanghai (CN); Jingyu Hu, Shanghai (CN); Wenjun Hu, Shanghai (CN); Junjie Wei, Shanghai (CN); Menglong Li, Shanghai (CN)

(73) Assignees: SHANGHAI DESANO BIO-PHARMACEUTICAL CO., LTD., Shanghai (CN); SHANGHAI DESANO CHEMICAL PHARMACEUTICAL CO., LTD., Shanghai (CN); SHANGHAI DESANO PHARMACEUTICALS CO., LTD., Shanghai (CN)

( * ) Notice: Subject to any disclaimer, the term of this patent is extended or adjusted under 35 U.S.C. 154(b) by 780 days.

(21) Appl. No.: 17/789,095

(22) PCT Filed: Dec. 21, 2020

(86) PCT No.: PCT/CN2020/138121
§ 371 (c)(1),
(2) Date: Jun. 24, 2022

(87) PCT Pub. No.: WO2021/129580
PCT Pub. Date: Jul. 1, 2021

(65) Prior Publication Data
US 2023/0075632 A1 Mar. 9, 2023

(30) Foreign Application Priority Data
Dec. 25, 2019 (CN) .......................... 201911357149.4

(51) Int. Cl.
*C07D 417/14* (2006.01)
(52) U.S. Cl.
CPC .................. *C07D 417/14* (2013.01)

(58) Field of Classification Search
CPC ..................................................... C07D 417/14
USPC ........................................................ 546/269.7
See application file for complete search history.

(56) References Cited

U.S. PATENT DOCUMENTS 6,812,238 B1   11/2004  Fukuda et al.
2022/0289735 A1*  9/2022  Bartos .................. C07D 417/14

FOREIGN PATENT DOCUMENTS

| CN | 106916152 A | 7/2017 |
| CN | 110128420 A | 8/2019 |
| WO | 2016016766 A2 | 2/2016 |
| WO | 2021/037597 A1 | 3/2021 |

OTHER PUBLICATIONS

The International Search Report with English Translation of International Application No. PCT/CN2020/138121 mailed Feb. 26, 2021, 6 pages.

* cited by examiner

*Primary Examiner* — Jeffrey S Lundgren
*Assistant Examiner* — Heather Dahlin
(74) *Attorney, Agent, or Firm* — NKL Law; Bin Lu; Allen Xue

(57) ABSTRACT

Provided is a method for preparing isavuconazonium sulfate. Specifically, the preparation method involved comprises: reacting a compound of formula V in the presence of a provided compound having a bisulfate ion so as to obtain isavuconazonium sulfate as shown in formula VI. The preparation method has the advantages of stable intermediate, easy separation and purification, simple operation, high reaction yield, and easy industrial production.

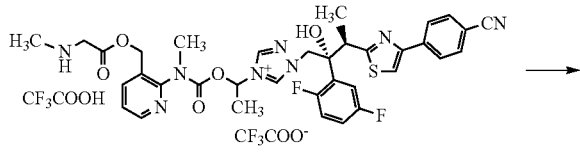

V

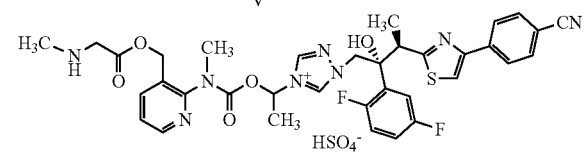

VI
isavuconazonium sulfate

14 Claims, No Drawings

METHOD FOR PREPARING ISAVUCONAZONIUM SULFATE

RELATED APPLICATIONS

This application is a U.S. National Stage Application under 35 U.S.C. 371 of International Patent Application No.: PCT/CN2020/138121, filed Dec. 21, 2020, which claims priority to Chinese Patent Application No.: 201911357149.4, filed Dec. 25, 2019.

TECHNICAL FIELD

The present invention belongs to the technical field of pharmaceutical chemistry, and specifically relates to a method for preparing isavuconazonium sulfate.

BACKGROUND

Isavuconazonium sulfate, with chemical name of 1-[[N-methyl-N-3-[(methylamino) acetoxymethyl]pyridin-2-yl] carbamoyloxy]ethyl-1-[(2R,3R)-2-(2,5-difluorophenyl)-2-hydroxy-3-[4-(4-cyanophenyl) thiazol-2-yl]butyl]-1H-[1,2,4]triazol-4-onium sulfate, was jointly developed by Anstella and Baselia, and approved by the US FDA for marketing on Mar. 6, 2015, and was used for treating adult patients with invasive aspergillosis and invasive mucormycosis.

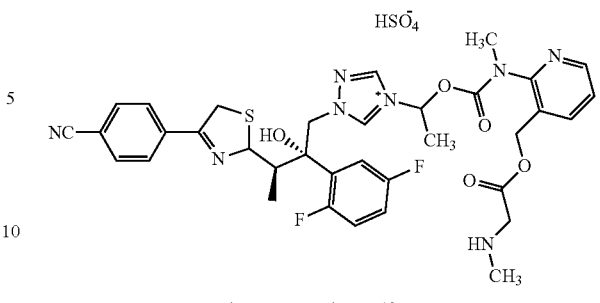

isavuconazonium sulfate

The structure of isavuconazonium sulfate consists of two fragments: a parent core part and a side chain structure. Wherein the parent core is the pharmacologically active part, i.e. isavuconazole; the side chain structure is a hydrophilic structural fragment, which can improve physical and chemical properties and increase water solubility of isavuconazole after docking with it.

Among existing preparation methods of isavuconazonium sulfate, the conversion to monosulfate is mostly achieved via the halogen salt of isavuconazonium. This reaction step is a technical difficulty in process synthesis, and it is also a technical problem at home and abroad.

The original research company has reported the following synthetic route: firstly, obtaining the iodide anion salt of isavuconazonium, then converting it into a chloride anion salt compound through ion exchange, followed by removing the protective group, and finally converting it to isavuconazoniummono sulfate.

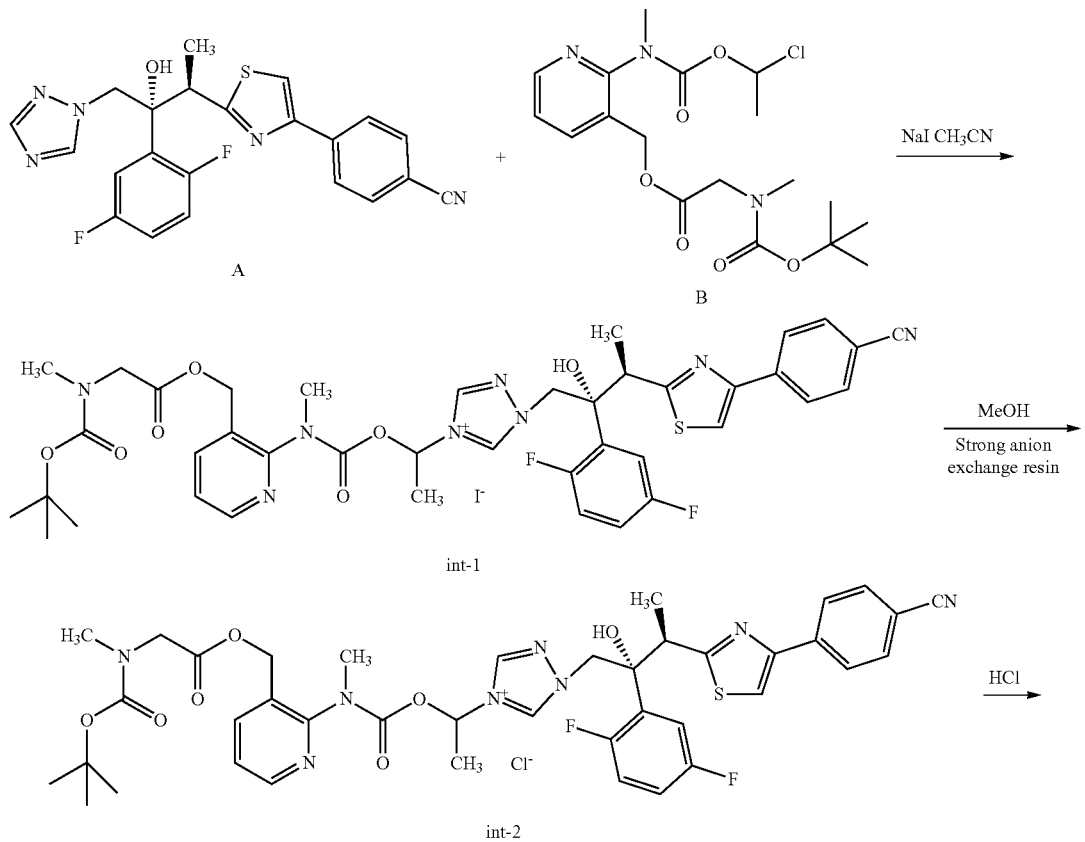

-continued

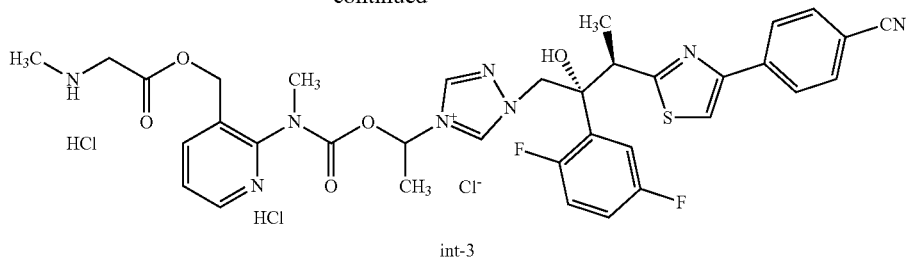

int-3

The above processes have the following disadvantages:

1) After fragment A and fragment B being docked, iodine anion intermediate 1 is obtained, but the reaction has a poor purity, and the purification is performed by column, which is difficult to carry out process amplification.

2) During the process of converting iodide anion salt into chloride anion salt intermediates, ion exchange chromatography is used. On the one hand, the process cost and operability increase, on the other hand, during process of purification by ion exchange resin, the purity of the intermediate becomes worse and requires to be purified by column chromatography again.

3) Intermediate 2 uses HCl to remove the protective group, but HCl is highly acidic, which will cause the production of the by-products of cyano alcoholysis during the experimental process, which is difficult to be subjected to subsequent purification; on the other hand, the obtained intermediate 3 is in the form of multi-hydrochloride, which is very easy to absorb water and produce by-products of cyanohydrolysis, thus it is necessary to strictly control the moisture during the experimental process and the experimental environment, which brings a lot of inconvenience to the operation and increase the cost of process control.

4) The patent does not disclose the step for converting halogen salt to mono-sulfate after obtaining intermediate 3, and this step is also the biggest difficulty in the synthesis of isavuconazonium sulfate.

In addition to the original research company, although other patents reported the improvement of the synthesis of the isavuconazonium sulfate, the synthesis method is still difficult to avoid the use of ion exchange resin or has problems of highly hygroscopic intermediate, low yield, the final product with undesirable purity and the like.

In summary, there is an urgent need in this field to develop a new method for preparing isavuconazonium sulfate, which does not need to use ion exchange resin, is easy to purify, has stable intermediate and is uneasy to produce by-products, is easy to operate, and is easy to industrialize.

SUMMARY OF THE INVENTION

The purpose of the present invention is to provide a new preparation method for preparing isavuconazonium sulfate, which does not need to use ion exchange resin, is easy to purify, has stable intermediate and is uneasy to produce by-products, and is easy to operate.

In the first aspect of the present invention, provided is a preparation method for preparing isovuconazonium sulfate, wherein the preparation method comprises the steps of:

(i) reacting a compound of formula V (isaconazole trifluoroacetate) in the presence of a compound providing bisulfate ions, thereby obtaining isavuconazonium sulfate of formula VI;

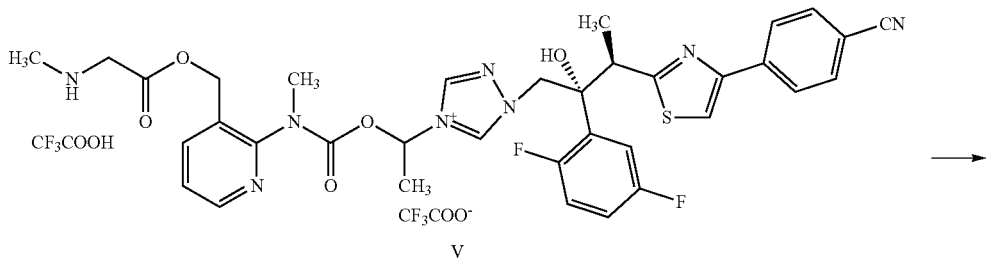

V

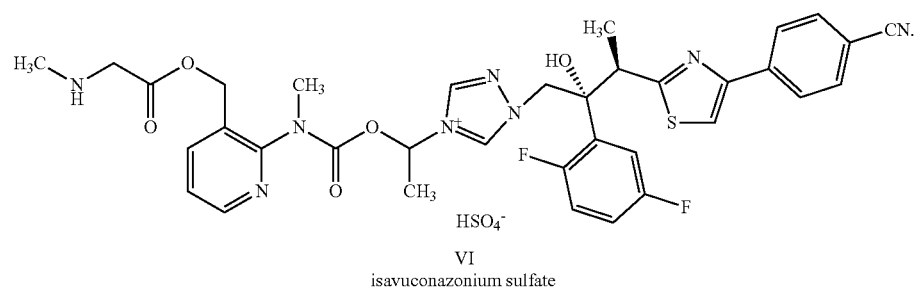

VI
isavuconazonium sulfate

In another preferred embodiment, the reaction of step (i) is carried out in a first mixed solvent, and the first mixed solvent is a mixed solvent consisting of water and a first organic solvent.

In another preferred embodiment, the first organic solvent is selected from the group consisting of ethyl acetate, isopropyl acetate, dichloromethane, toluene, methyl tert-butyl ether, and combinations thereof.

In another preferred embodiment, the volume ratio of the water to the first organic solvent is (0.5-5):1; preferably, (0.8-3):1; more preferably, (1-2):1.

In another preferred embodiment, in step (i), the molar ratio of the bisulfate ion to the compound of formula V is (3-50):1; preferably, (5-30):1; more preferably, (10-20):1.

In another preferred embodiment, in step (i), the compound providing bisulfate ions is selected from the group consisting of sulfuric acid, bisulfate salt, sulfate salt, and combinations thereof.

In another preferred embodiment, in step (i), the bisulfate salt is selected from the group consisting of sodium bisulfate, potassium bisulfate, ammonium bisulfate, calcium bisulfate, and combinations thereof.

In another preferred embodiment, in step (i), the sulfate salt is selected from the group consisting of sodium sulfate, potassium sulfate, ammonium sulfate, calcium sulfate, and combinations thereof.

In another preferred embodiment, in step (i), the reaction is carried out at 0 to 20° C. (preferably, at 0 to 15° C.; more preferably, at 0 to 10° C.).

In another preferred embodiment, step (i) further comprises a first treatment step for isolating and/or purifying the isavuconazonium sulfate.

In another preferred embodiment, the first treatment step comprises: obtaining aqueous phase by liquid separation treatment, removing inorganic small molecule salt impurities, performing treatment (such as lyophilization), thereby obtaining isavuconazonium sulfate.

In another preferred embodiment, removing inorganic small molecule salt impurities by adsorption and desorption treatment.

In another preferred embodiment, prior to obtaining aqueous phase by liquid separation treatment, optionally further comprises a step of adding water for extraction.

In another preferred embodiment, the first treatment step comprises: obtaining aqueous phase by liquid separation treatment, performing adsorption and desorption treatment on the aqueous phase, and obtaining isavuconazonium sulfate from the eluate obtained from desorption.

In another preferred embodiment, the adsorption is physical adsorption.

In another preferred embodiment, the adsorbent used for adsorption is selected from the group consisting of silica gel, macroporous adsorption resin, and combinations thereof.

In another preferred embodiment, before performing the adsorption and desorption treatment in the first treatment step, further comprises a step of extracting the aqueous phase obtained by the liquid separation with an extractant.

In another preferred embodiment, the extractant is selected from the group consisting of ethyl acetate, isopropyl acetate, dichloromethane, toluene, methyl tert-butyl ether, isopropyl ether, n-heptane, and combinations thereof.

In another preferred embodiment, after performing the adsorption and desorption treatment in the first treatment step, the method further comprises: removing the organic phase in the eluent (preferably, removing the organic phase in the eluent by concentration), and then obtaining the isavuconazonium sulfate from the concentrated eluent by lyophilization.

In another preferred embodiment, the organic phase in the eluent is mainly the eluent used for desorption (for example, >50% by volume, or >80% by volume in the organic phase is the eluent).

In another preferred embodiment, the eluent used for desorption is selected from the group consisting of alcohols organic solvents, ketones organic solvents, ethers organic solvents, esters organic solvents, halogenated hydrocarbons organic solvents, hydrocarbons organic solvents, aromatic organic solvents, and combinations thereof.

In another preferred embodiment, the eluent used for desorption is selected from the group consisting of methanol, ethanol, isopropanol, acetone, tetrahydrofuran, ethyl acetate, isopropyl acetate, dichloromethane, methyl tert-butyl ether, isopropyl ether, toluene, n-heptane, and combinations thereof.

In another preferred example, the step (i) includes steps of: (i-1) in a first mixed solvent, reacting a compound of formula V in the presence of a compound providing bisulfate ions, thereby obtaining a mixture containing isavuconazonium sulfate (a compound of formula VI); (i-2) treating the mixture of isavuconazonium sulfate by the first treatment step, thereby obtaining isavuconazonium sulfate of formula VI.

In another preferred example, the step (i-2) includes steps of:

(i-2-1) subjecting the mixture containing isavuconazonium sulfate obtained in step (i-1) to a liquid separation treatment, thereby obtaining an aqueous phase containing isavuconazonium sulfate;

(i-2-2) subjecting the aqueous phase containing isavuconazonium sulfate obtained in step (i-2-1) to adsorption (preferably, physical adsorption) and desorption treatment (preferably, subjecting the aqueous phase containing isavuconazonium sulfate obtained in step (i-2-1) to adsorption (preferably, physical adsorption) and desorption treatment after subjecting to extraction treatment with extractant), thereby obtaining an eluent containing isavuconazonium sulfate; and (i-2) removing the organic phase in the eluent containing isavuconazonium sulfate, treating the eluent containing isavuconazonium sulfate wherein organic phase was removed, thereby obtaining isavuconazonium sulfate of formula VI.

In another preferred embodiment, in the step (i-2-3), the treatment refers to lyophilization.

In another preferred embodiment, the preparation method further comprises a preparation step of the compound of formula V;

wherein, the preparation step of the compound of formula V includes:

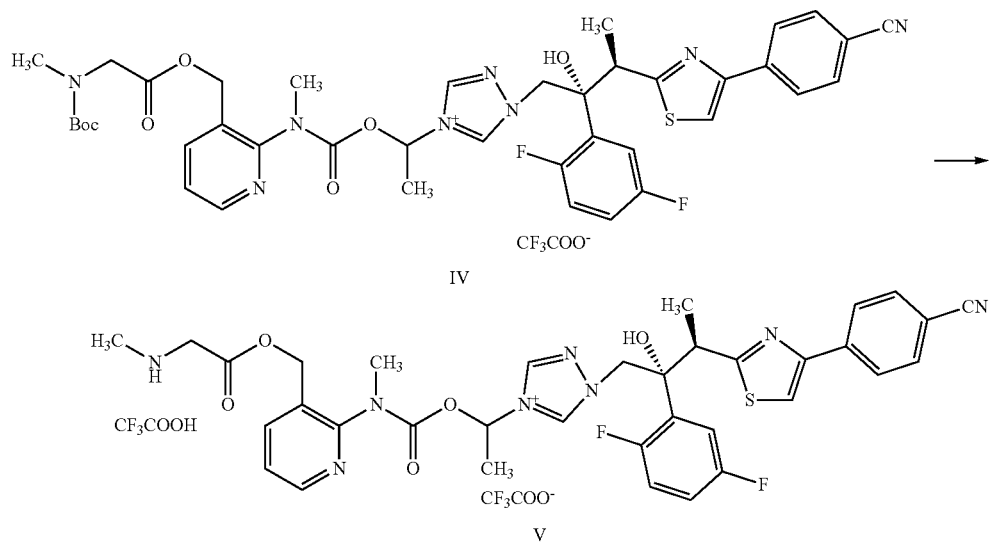

In the presence of tert-butyl ion trapping agent and trifluoroacetic acid, subjecting the compound of formula IV to a deprotection reaction, thereby obtaining a compound of formula V.

In another preferred embodiment, in the preparation step of the compound of formula V, the tert-butyl ion trapping agent is selected from the group consisting of acetonitrile, malononitrile, benzonitrile, thiophenol, p-methoxythiophenol, methyl thiophenol, phenol, cresol, anisole, dianisole, thioanisole, dimethyl sulfide, and combinations thereof.

In another preferred embodiment, in the preparation step of the compound of formula V, the ratio of volume-molar (ml/mmol) of the tert-butyl ion trapping agent to the compound of formula IV is (0.2-10):1; preferably, (0.5-8):1; more preferably, (0.5-2):1.

In another preferred embodiment, in the preparation step of the compound of formula V, the deprotection reaction is carried out in the presence of water.

In another preferred embodiment, in the preparation step of the compound of formula V, the deprotection reaction is carried out in the presence of a tert-butyl ion trapping agent, trifluoroacetic acid and water.

In another preferred embodiment, in the preparation step of the compound of formula V, the water is added to the reaction system in the form of trifluoroacetic acid aqueous solution.

In another preferred embodiment, in the preparation step of the compound of formula V, the mass ratio of the trifluoroacetic acid to the total amount of water and trifluoroacetic acid is (0.80-0.99):1; preferably, (0.85-0.98):1; more preferably, (0.90-0.98):1.

In another preferred embodiment, the preparation step of the compound of formula V includes: in the presence of tert-butyl ion trapping agent and trifluoroacetic acid or trifluoroacetic acid aqueous solution, subjecting the compound of formula IV to a deprotection reaction, thereby obtaining a compound of formula V.

In another preferred embodiment, in the preparation step of the compound of formula V, the content of the trifluoroacetic acid in the trifluoroacetic acid aqueous solution is 80-99 wt %; preferably, 85-98 wt %; more preferably, 90-98 wt %.

In another preferred embodiment, in the preparation step of the compound of formula V, the molar ratio of the trifluoroacetic acid to the compound of formula IV is (1-200): 1; preferably, (1-100): 1; more preferably, (10-80): 1; and most preferably, (20-60): 1.

In another preferred embodiment, in the preparation step of the compound of formula V, the reaction temperature of the deprotection reaction is −10 to 40° C.; preferably, 10 to 40° C.; more preferably, 20 to 30° C.

In another preferred embodiment, in the preparation step of the compound of formula V, the deprotection reaction is carried out in a second inert solvent.

In another preferred embodiment, in the preparation step of the compound of formula V, the second inert solvent is selected from the group consisting of dichloromethane, ethyl acetate, and combinations thereof.

In another preferred embodiment, in the preparation step of the compound of formula V, the ratio of volume-molar (ml:mmol) of the second inert solvent to the compound of formula IV is (1-15): 1; preferably (1-10): 1; more preferably (1-5): 1; and most preferably (2-3): 1.

In another preferred embodiment, the preparation step of the compound of formula V further comprises a second treatment step for isolating the compound of formula V.

In another preferred embodiment, the second treatment step comprises: optionally diluting, washing with water (preferably washing to a pH between 4 and 6), drying and concentrating.

In another preferred embodiment, in the second treatment step, the solvent used for dilution is selected from the group consisting of dichloromethane, ethyl acetate, methyl tert-butyl ether, and combinations thereof.

In another preferred embodiment, in the second treatment step, the amount of the solvent used for dilution is that the ratio of volume-molar of the solvent used for dilution to the compound of formula V is (1-15): 1; preferably (1-10): 1; more preferably (1-5): 1; most preferably (2-3): 1.

In another preferred embodiment, the second treatment step comprises the steps of: diluting the mixture containing the compound of formula V by adding the solvent used for dilution, washing the organic phase with water, drying the organic phase, and concentrating, thereby obtaining the compound of formula V.

In another preferred embodiment, in the second treatment step, washing the organic phase until the pH of the aqueous phase is 4-6.

In another preferred embodiment, the preparation step of the compound of formula V includes steps of:

(2.1) adding a trifluoroacetic acid or a trifluoroacetic acid aqueous solution to the mixture of the compound of formula IV in the second inert solvent at −10 to 20° C. (preferably, 0 to 10° C.). thereby obtaining a reaction system containing trifluoroacetic acid;

(2.2) subjecting the compound of formula IV in the reaction system containing trifluoroacetic acid to a deprotection reaction, thereby obtaining a mixture containing the compound of formula V; and (2.3) isolating the compound of formula V from the mixture containing the compound of formula V by a second treatment step.

In another preferred embodiment, the preparation method further comprises a preparation step of the compound of formula IV;

wherein, the preparation step of the compound of formula IV includes:

selected from the group consisting of sodium trifluoroacetate, potassium trifluoroacetate, ammonium trifluoroacetate, magnesium trifluoroacetate, lithium trifluoroacetate, and combinations thereof.

In another preferred embodiment, in the preparation step of the compound of formula IV, the third organic solvent is selected from the group consisting of ethyl acetate, isopropyl acetate, dichloromethane, toluene, methyl tert-butyl ether, and combinations thereof.

In another preferred embodiment, in the preparation step of the compound of formula IV, the volume ratio of water to the third organic solution is 1 (0.1-10); preferably, 1:(0.5-5).

In another preferred embodiment, the preparation step of the compound of formula IV further comprises a third treatment step for isolating the compound of formula IV.

In another preferred embodiment, the third treatment step comprises liquid separating, optionally drying and concentrating the organic phase.

In another preferred embodiment, the preparation step of the compound of formula IV includes the steps of:

(1.1) providing a solution of the compound of formula III in a third organic solvent;

(1.2) mixing the solution of the step (1.1) with an aqueous solution containing trifluoroacetate ion, thereby obtaining a third mixed system containing the compound of formula IV;

(1.3) isolating the compound of formula IV from the third mixed system obtained in step (1.2) by a third treatment step.

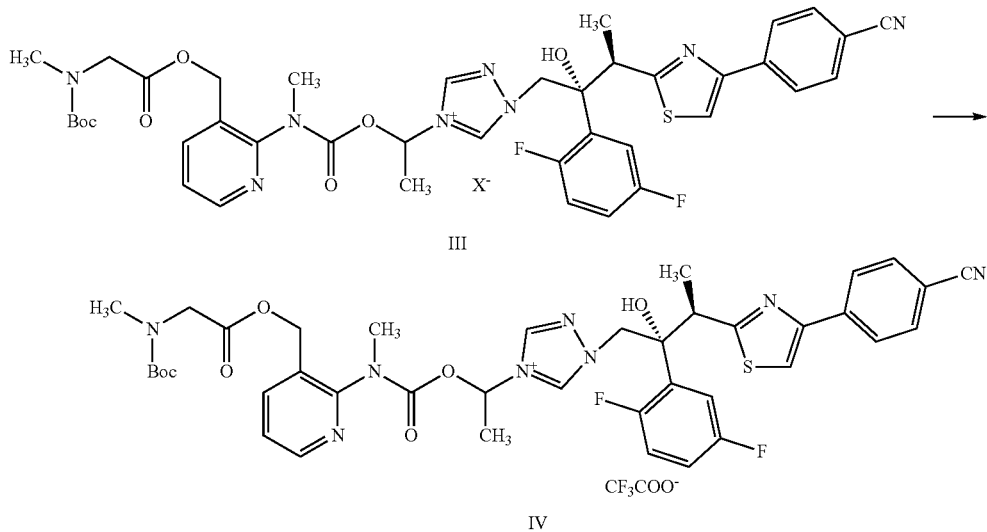

in a third mixed solvent, subjecting the compound of formula III and the trifluoroacetate ion to an anion exchange reaction, thereby obtaining the compound of formula IV; wherein the third mixed solvent is a mixed solvent consisting of water and a third organic solvent, X⁻ is an anion selected from the group consisting of Cl⁻, I⁻, HSO₄⁻, 0.5SO₄²⁻, and combinations thereof.

In another preferred embodiment, in the preparation step of the compound of formula V, the trifluoroacetate ion is provided by a compound selected from the group consisting of trifluoroacetic acid, trifluoroacetate salt, and combinations thereof.

In another preferred embodiment, in the preparation step of the compound of formula IV, the trifluoroacetate salt is In another preferred embodiment, in the the step (1.2), the aqueous solution containing trifluoroacetate ion refers to an aqueous solution of trifluoroacetic acid, trifluoroacetate or a combination thereof.

In another preferred embodiment, in the step (1.2), the content of trifluoroacetate ions in the aqueous solution containing trifluoroacetate ions is 5-15 wt %.

In the second aspect of the present invention, provided is a method for preparing isavuconazonium sulfate, the method comprising the following steps:

(1) a parathion step of compound of formula IV:

in a third mixed solvent, subjecting the compound of formula III and the trifluoroacetate ion to an anion exchange reaction, thereby obtaining the compound of formula IV;

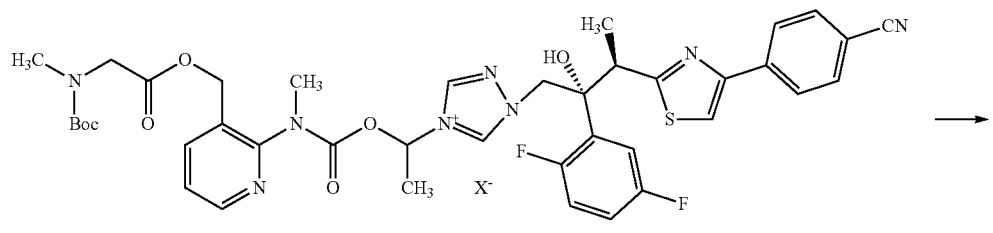

III

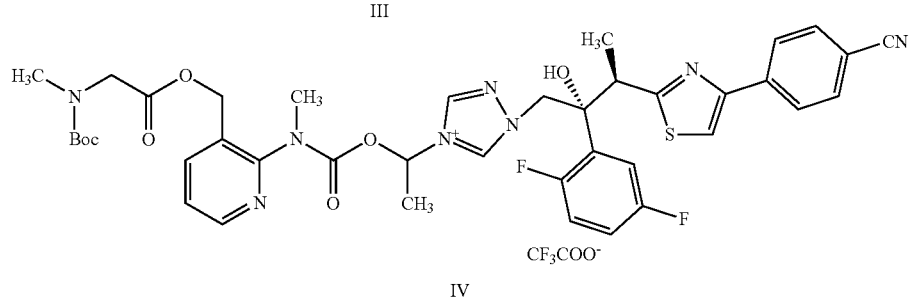

IV wherein
the third mixed solvent is a mixed solvent consisting of water and a third organic solvent, $X^-$ is an anion selected from the group consisting of $Cl^-$, $I^-$, $HSO_4^-$, $0.5SO_4^{2-}$, and combinations thereof;

(2) a preparation step of compound of formula V:

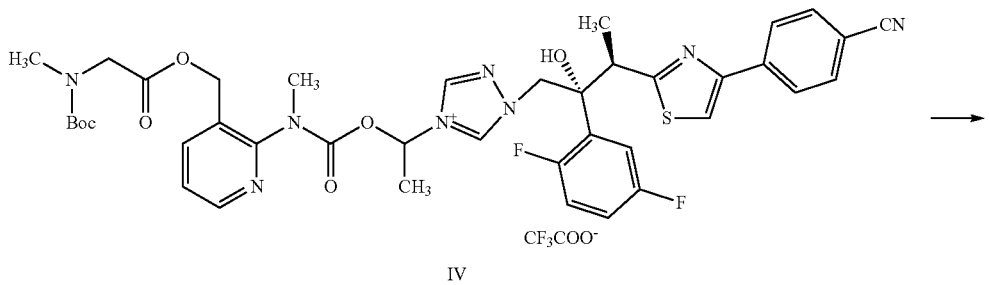

IV

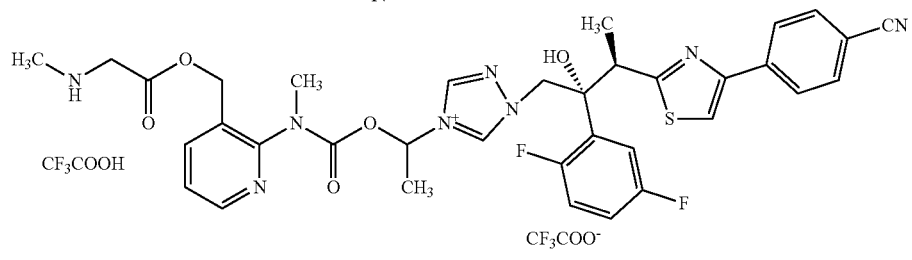

V

In the presence of a tert-butyl ion trapping agent and a trifluoroacetic acid, subjecting the compound of formula IV to a deprotection reaction, thereby obtaining a compound of formula V;
and
(3) a preparation step of compound of formula VI:

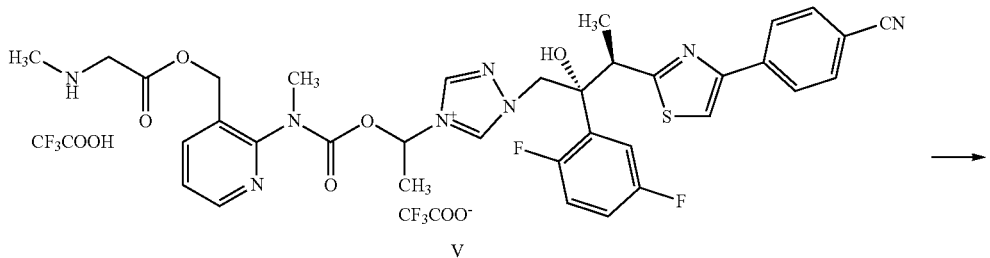

V

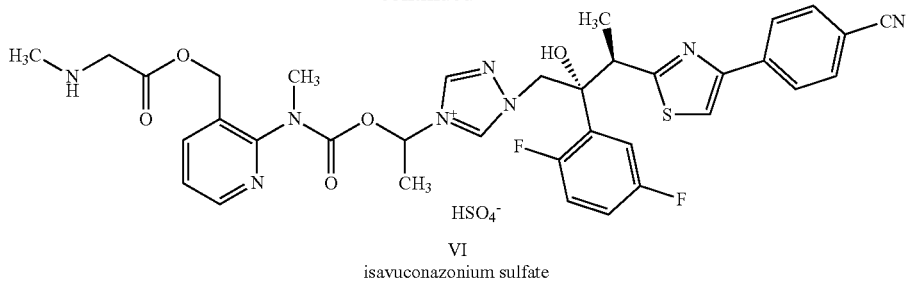

VI
isavuconazonium sulfate reacting a compound of formula V in the presence of a compound providing bisulfate ions, thereby obtaining isavuconazonium sulfate of formula VI.

In another preferred embodiment, the step (1) is the same as the preparation step of the compound of formula IV according to the first aspect.

In another preferred embodiment, the step (2) is the same as the preparation step of the compound of formula V according to the first aspect.

In another preferred embodiment, the step (3) is the same as the step (i) according to the first aspect.

In another preferred embodiment, prior to step (1), the method further comprises the following step:

(0) in a fourth inert solvent, reacting the compound of formula I with the compound of formula II, thereby obtaining a compound of formula III.

for 10-20 hours, thereby obtaining a reaction mixture containing the compound of formula III;

(0.2) filtering the reaction mixture containing the compound of formula III and concentrating the filtrate, thereby obtaining a crude product containing the compound of formula III; and (0.3) dissolving the crude product containing the compound of formula III in an organic solvent, washing the organic phase with acid, drying the organic phase, and concentrating, thereby obtaining the compound of formula III, wherein the organic solvent is selected from one or more of the group consisting of dichloromethane, ethyl acetate, methyl tert-butyl ether, isopropyl ether, and n-heptane.

In another preferred embodiment, in the step (0.3), the acid used for washing with acid is selected from the group

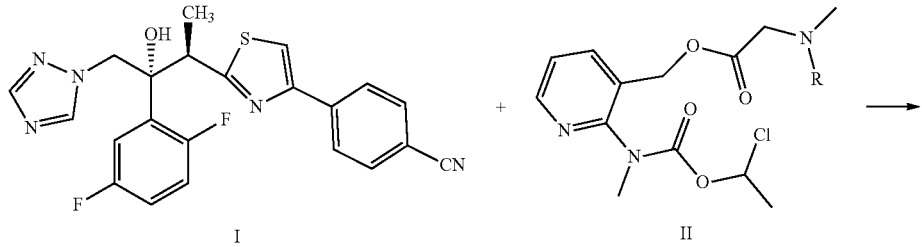

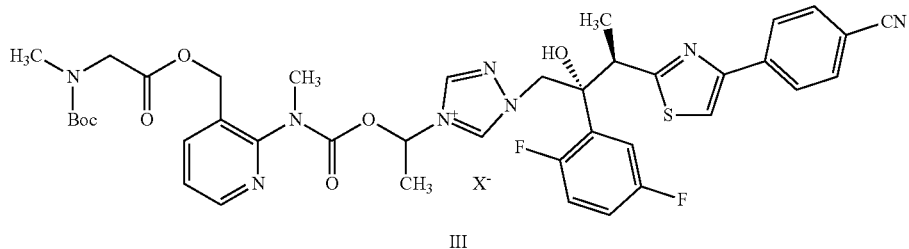

III wherein the definition of X⁻ is the same as before.

In another preferred embodiment, the reaction of step (0) is carried out in the presence of sodium iodide.

In another preferred embodiment, the fourth inert solvent is acetonitrile.

In another preferred example, the step (0) includes following steps:

(0.1) providing a mixture of compound I, compound II and sodium iodide in acetonitrile, and reacting at 50-60° C.

consisting of sulfuric acid, hydrochloric acid, trifluoroacetic acid, and combinations thereof.

In the third aspect of the present invention, provided is an isavuconazonium sulfate prepared by the preparation method according to the first aspect, the method according to the second aspect, or the method according to the third aspect.

In the fourth aspect of the present invention, provided is an intermediate for the preparing isavuconazonium sulfate, the intermediate is shown in formula IV

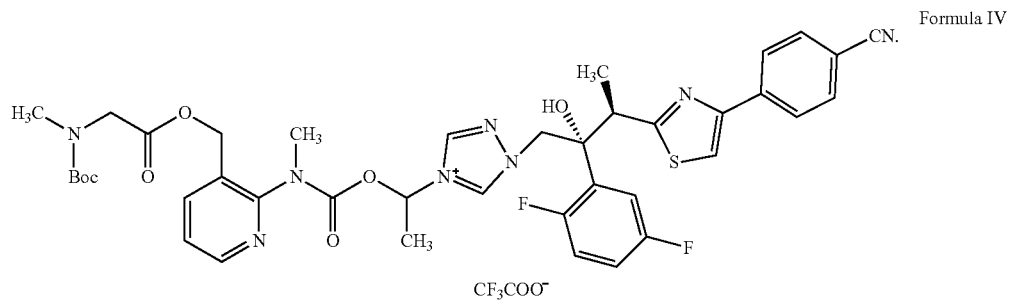

Formula IV

In the fifth aspect of the present invention, provided is an intermediate for the preparing isavuconazonium sulfate, the intermediate is shown in formula V

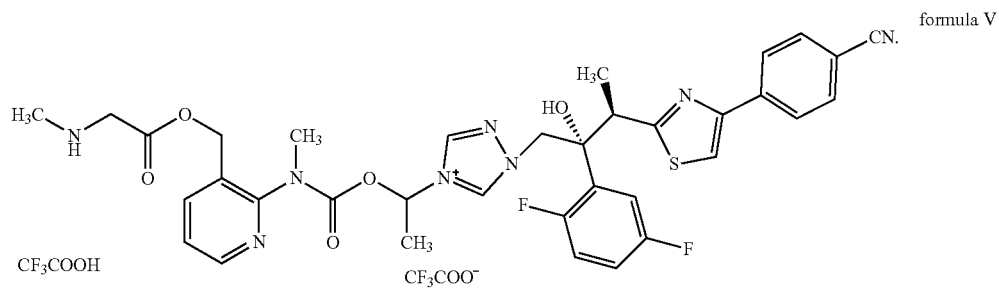

formula V

DETAILED DESCRIPTION OF THE INVENTION

After long-term and in-depth research, the inventors unexpectedly found that, in the presence of compounds providing bisulfate ions or bisulfate ions, a compound of formula V with trifluoroacetate anion is particularly suitable for efficient conversion to isavuconazonium sulfate, and the resulting isavuconazonium sulfate is very easy to isolate from the system and easy to purify. Therefore, the inventors provide for the first time a new route for preparing isavuconazonium sulfate using the compound of formula V as an intermediate. Moreover, the intermediates in the form of trifluoroacetate (Formula IV, Formula V) used in the present invention are uneasy to absorb moisture and is more stable. Based on this, the inventors completed the present invention.

Terms

As used herein, macroporous adsorption resin is a kind of macroporous adsorption resin is a kind of macromolecule adsorption resin without exchange group and having macroporous structure.

It should be understood that in this context, when a certain group in the general formula of a certain compound can be a combination of several specific groups, the general formula represents a mixture of multiple specific compounds. For example, the compound of Formula III, wherein X is a combination of I⁻ and Cl⁻, refers to a mixture of a specific compound wherein X⁻ is Cl⁻ and a specific compound wherein X is I⁻.

It should be understood that within the scope of the present invention, the above technical features of the present invention and the technical features specifically described in the following (eg, embodiments) can be combined with each other, thereby forming a new or preferred technical solution. Due to space limitations, it will not be repeated herein.

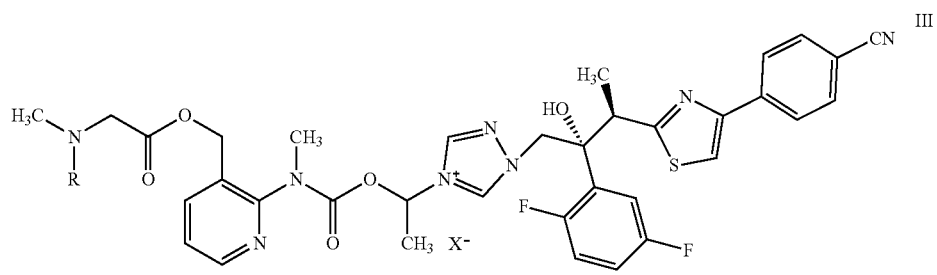

III

It should be understood that, unless otherwise specified, each compounds or substances or the like involved in the reaction may be present in a suitable form in the reaction system. For example, as to a compound providing bisulfate ions, it may be in a form of compound in an anhydrous system; or it may be in a form of ions in an aqueous system, such as bisulfate ions and appropriate cations.

Preparation Method of Isavuconazonium Sulfate

In order to overcome problems of the methods in the prior art that intermediates are unstable, easy to absorb water and hydrolysis, and need repeated purification with chromatography column, the resulting product needs to be treated by ion exchange chromatography, the purification operation is complex, and cannot be industrialized scale-up production and other problems. The present invention provides a new method for preparing isavuconazonium sulfate, the intermediates in the preparation method of the present invention are stable, the intermediates and the product are easy to purify, and the operation is simple, there is no need to use ion exchange chromatography, impurities are easy to remove, and the product purity is high, easy to operate, and very suitable for industrial production.

In a specific embodiment, the present invention provides a method for preparing isavuconazonium sulfate, including:

(A) subject the compound of formula IV under the action of trifluoroacetic acid to a deprotection reaction, thereby obtaining the deprotected compound of formula V;

(B) then further reacting a compound of formula V in the presence of a compound providing bisulfate ions, thereby obtaining a compound of isavuconazonium sulfate.

(A1) adding a certain amount of tert-butyl positive ion trapping agent and trifluoroacetic acid or its aqueous solution (preferably, trifluoroacetic acid aqueous solution of trifluoroacetic acid) dropwise to an organic solvent system containing the compound of formula IV at about −10~40° C., reacting while keeping the temperature (such as reacting at 15~30° C.) until complete conversion of substrate compound of formula IV, thereby obtaining a mixture containing compound of formula V;

(A2) treating the mixture containing the compound of formula V (for example, treating by the second treatment step), thereby obtaining the compound of formula V.

(B) Reacting the compound of the formula V while keeping the temperature (such as reacting at room temperature) in a system containing a compound providing bisulfate ions (such as sulfuric acid, sulfate salt, and/or bisulfate salt), subjecting to adsorption and desorption, thereby obtaining the compound of isavuconazonium sulfate.

In another preferred embodiment, in the step (A1), the content of the trifluoroacetic acid in the trifluoroacetic acid aqueous solution is 80-99 wt %; preferably, 85-98 wt %; more preferably, 90-98 wt %.

In another preferred embodiment, in step (B), the molar ratio of the bisulfate ion to the compound of formula V is (3-50):1; preferably, (5-30):1; more preferably, (10-20):1. It should be understood that the molar amount of the sulfate ion includes any form that may be present in the reaction system and is capable of interconversion with the bisulfate ion (e.g., form of compound (e.g., bisulfate salt or sulfuric

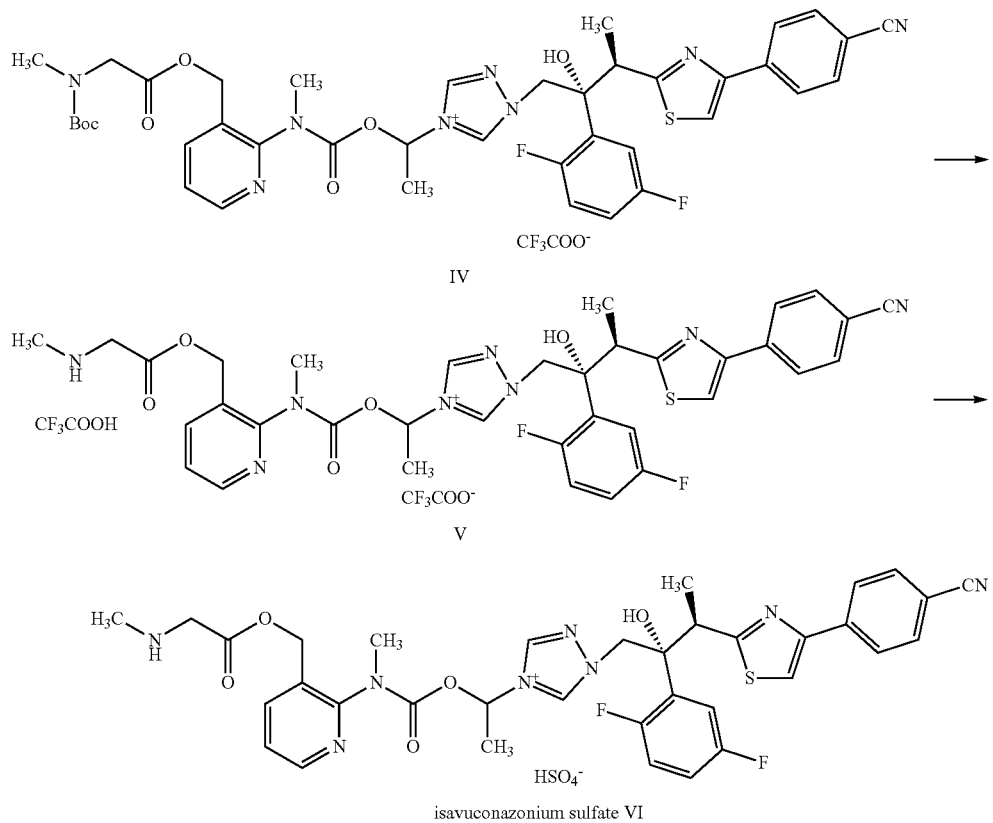

isavuconazonium sulfate VI

In a specific embodiment, the preparation method specifically includes the following steps.

acid), ionized form of bisulfate ions, i.e., sulfate ion, and ionic form, i.e., bisulfate ion).

In another preferred embodiment, the organic solvent in the step (A1) is selected from one or more of dichloromethane, acetonitrile and ethyl acetate; the equivalent ratio of trifluoroacetic acid to the compound of formula IV is 80-10:1.

In another preferred embodiment, specifically step (A2) is: adding an organic solvent for dilution (such as dichloromethane, ethyl acetate, methyl tert-butyl ether, or a combination thereof) to the system containing the compound of formula V obtained in the step (A1), stirring, liquid separating and then washing the organic phase with water until the pH of the aqueous phase is between 4 and 6, drying and concentrating the organic phase, thereby obtaining the compound of formula V.

In another preferred embodiment, the bisulfate salt in the step (B) is selected from one or more of sodium bisulfate, potassium bisulfate, ammonium sulfate and calcium bisulfate; and/or the adsorbent used for adsorption is selected from one or two of silica gel and macroporous adsorption resin.

In another preferred example, the compound of formula IV can be synthesized by the following method:

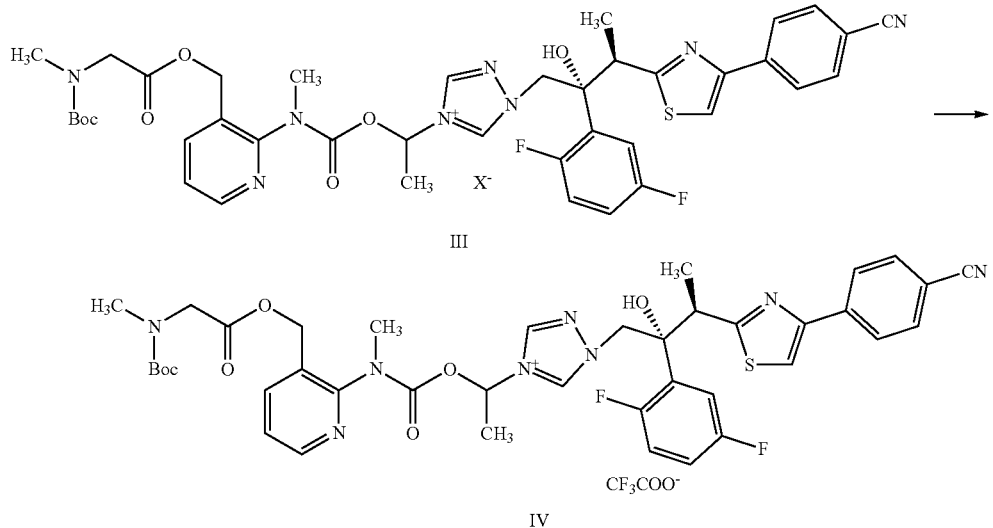

wherein $X^-$ is selected from one or more of $Cl^-$, $I^-$, $0.5SO_4^{2-}$, or $HSO_4^-$.

The compound of formula III undergoes anion exchange in the presence of trifluoroacetate ions or compounds providing trifluoroacetate ions (such as trifluoroacetic acid or sodium trifluoroacetate), thereby obtaining the compound of formula IV.

In another preferred example, the compound of formula III is obtained by reacting the compound of formula I with the compound of formula II

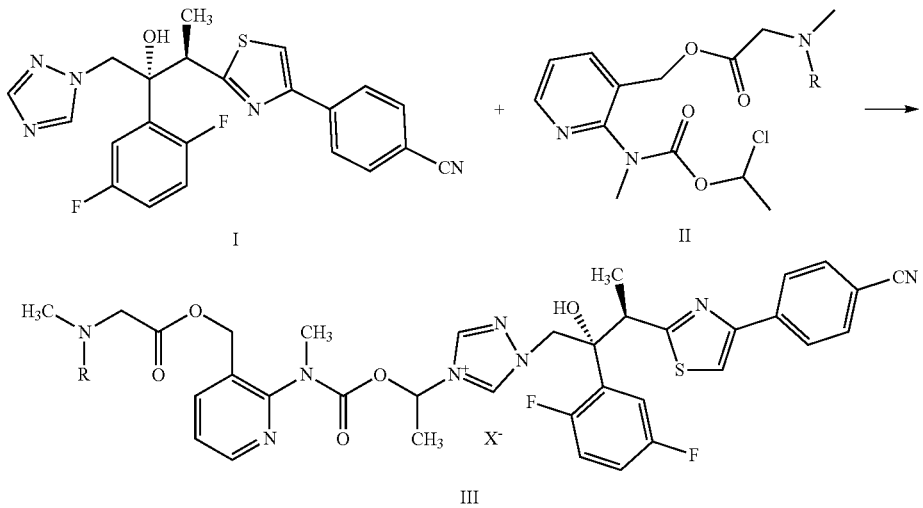

In another preferred embodiment, dissolving the compound of formula III in a third organic solvent, then adding an aqueous solution containing trifluoroacetate ions, stirring, and concentrating the organic phase, thereby obtaining the compound of formula III; preferably, the third organic solvent is selected from one or more of dichloromethane, ethyl acetate, methyl tert-butyl ether, isopropyl ether, and n-heptane; and/or the trifluoroacetate ions are provided by trifluoroacetic acid, trifluoroacetate salt, or a mixture thereof.

In another preferred embodiment, the trifluoroacetate salt may be selected from one or more of sodium trifluoroacetate, potassium trifluoroacetate, ammonium trifluoroacetate, magnesium trifluoroacetate, lithium trifluoroacetate, and ammonium trifluoroacetate.

In another preferred example, the step for preparing the compound of formula III specifically is:

(a) Suspending the compound I, compound II and sodium iodide in acetonitrile solvent, and keeping the temperature between 50 to 60° C. and stirring for 10 to 20 hours until the complete conversion of compound II.

(b) Filtering and concentrating the mother liquor to obtain crude 1 containing the compound of formula III.

(c) Dissolving the crude 1 of compound of formula III in ethyl acetate, washing the organic phase with acid, drying and concentrating the organic phase to obtain the compound of formula III.

In another preferred embodiment, in the step (c), the acid is selected from sulfuric acid, hydrochloric acid, or trifluoroacetic acid.

Intermediate of Isavuconazonium Sulfate

The present invention further provides an intermediate that is very suitable for preparing isavuconazonium sulfate.

In a specific embodiment, the present invention provides an intermediate as shown in formula IV.

The Main Advantages of the Present Invention Include:

(1) The compound of formula V provided by the present invention can be well dissolved in organic solvent, and can be purified by pulping with solvent or recrystallization, and this intermediate is convenient for storage and transportation.

(2) The intermediate provided by the present invention is uneasy to absorb moisture, thus avoiding the disadvantage of the original process that the halide ion intermediate is easy to absorb moisture and difficult to filter.

(3) The solubility difference between the compound of formula V and the isavuconazonium sulfate is significant, which makes the the compound of formula V being very suitable for anion exchange with sulfate salt to obtain a product with better purity. In particular, in the preferred preparation method of the present invention, the high-efficiency exchange of anions achieved by a specific dosage ratio of the bisulfate ions to the compound of formula V, and further improves the single step and overall yield of the method of the present invention.

Using the method of the present invention to prepare isavuconazonium sulfate, the reaction and operating conditions are simple, the reaction conditions are mild, and it is easy to implement in industrialization; each steps are conventional reaction, the yield is high, and the purity is high; the total yield of resulting isavuconazonium sulfate can reach more than 80%, the yield in terms of the compound of formula III can reach more than 86%, and the purity of final product can reach 99.8% or more.

(4) In addition, trifluoroacetic acid itself can be used to remove the protecting group Boc in the compound of formula IV, thus using the intermediates or method of the present invention to prepare isavuconazonium sulfate can avoid the introduction of other impurity anions during the

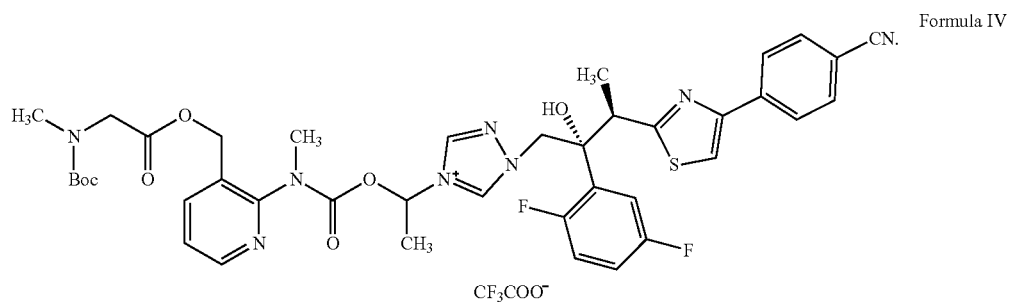

In a specific embodiment, the present invention provides an intermediate as shown in formula IV.

process of deprotection, thereby avoiding the reduction of purity and/or increasing unnecessary post-treatment steps.

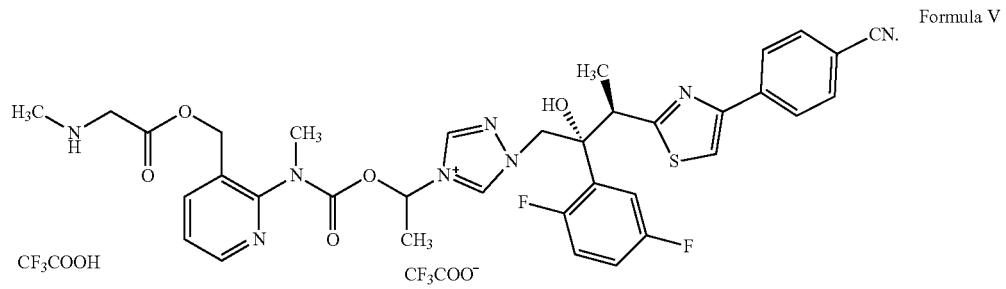

The present invention was further described hereafter in combination with specific embodiments. It should be understood that these examples are only used to illustrate the and not to limit the scope of the invention. The experimental methods without specific conditions in the following examples generally follow the conventional conditions or the conditions suggested by the manufacturer. Unless otherwise stated, percentages and parts are percentages by weight and parts by weight.

Example 1 Preparation of Compound of Formula III-1

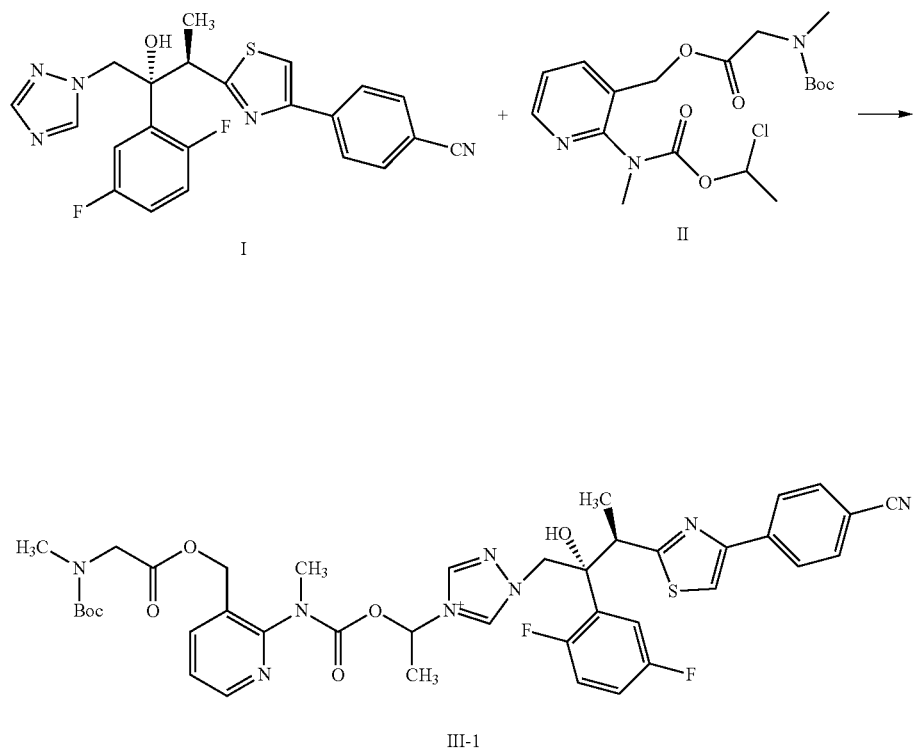

28.5 g (0.068 mol, 2.0 eq) compound of formula II was added into the reaction bottle, 75 ml acetonitrile was added, and stirred till clear at room temperature, 15.0 g (0.034 mol, 1.0 eq) compound of formula I and 7.8 g (0.052 mol, 1.5 eq) sodium iodide were added, the system was heated to 50° C. and kept at 50~60° C. and reacted until the compound of formula II was completely converted. The reaction solution was filtered and concentrated to obtain crude compound of formula III-1.

The crude compound of formula III-1 was dissolved in 150 ml of ethyl acetate, 150 ml of 0.5M H2SO4 solution was added, the organic phase was washed twice, the aqueous phase was combined and reextracted with ethyl acetate once, the ethyl acetate phases were combined, and concentrated to obtain 57.73 g of the compound of the formula III-1 (yield: 93.7%, purity: 95.6%).

Example 2 Preparation of Compound of Formula IV

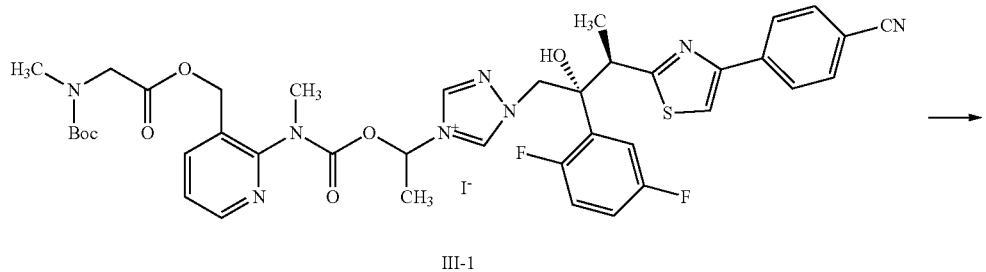

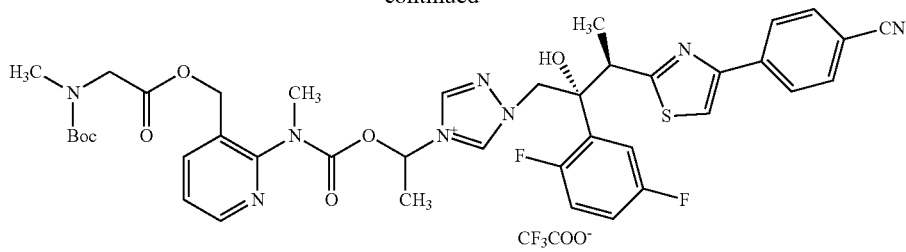

IV 57.0 g (0.06 mol) of compound of formula III-1 was dissolved in 150 ml of dichloromethane, after 150 ml of 10 wt % sodium trifluoroacetate aqueous solution was added and mixed, the mixture was stirred at room temperature for 1-2 hours, the liquid was separated, the organic phase was dried over anhydrous sodium sulfate, and concentrated to obtain 55.74 g of compound of formula IV (yield: 98.6%, purity: 96.2%, iodine ion: 0.3%).

Example 3 Preparation of Compound of Formula IV 57.0 g (0.06 mol) of compound of formula III-1 was dissolved in 150 ml of ethyl acetate, after 150 ml of 10 wt % sodium trifluoroacetate aqueous solution was added and mixed, the mixture was stirred at room temperature for 1-2 hours, the liquid was separated, the organic phase was dried over anhydrous sodium sulfate, and concentrated to obtain 55.0 g of compound of formula IV (yield: 97.9%, purity: 95.6%, iodine ion: 0.4%).

Example 4 Preparation of Compound of Formula V 55.7 g (0.06 mol, 1.0 eq) compound of formula IV was dissolved in 160 ml of dichloromethane, 60 ml of acetonitrile was added into the reaction system at the same time, the temperature was reduced to about 0~5° C. Then 279 g (2.4 mol, 40 eq) of 98% trifluoroacetic acid aqueous solution was slowly added dropwise to the system, the temperature will rise during the adding process, and the dropping speed was controlled to maintain the temperature below 10° C. After the completion of dropping, the system was heated to 25~30° C., and stirred while keeping the temperature until the compound of formula IV was completely converted (reaction is completed for 8-10 h). 160 ml of dichloromethane was added to dilute the reaction solution, the organic phase was washed with water until the pH of the aqueous phase becomes between 4 and 6, the organic phase was dried over anhydrous sodium sulfate, and concentrated to obtain 54.3 g of compound of formula V (yield: 96.0%; Purity: 96.3%; Iodine ion:<0.1%).

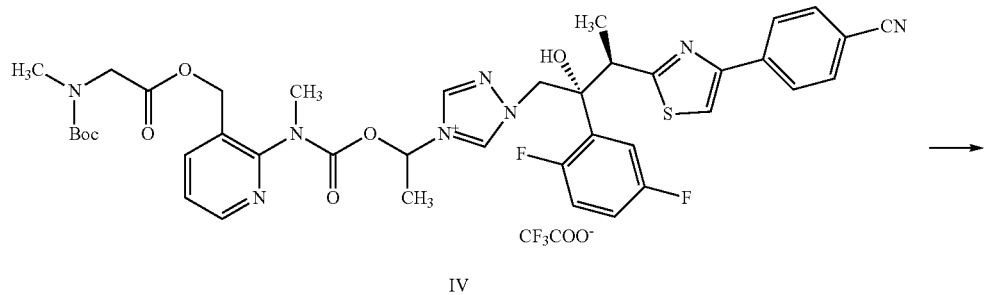

IV

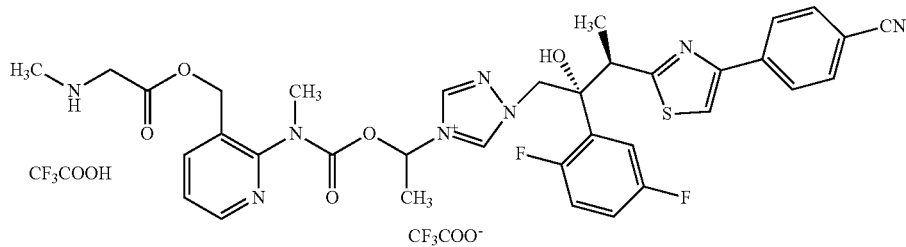

V

Example 5 Preparation of Compound of Formula V

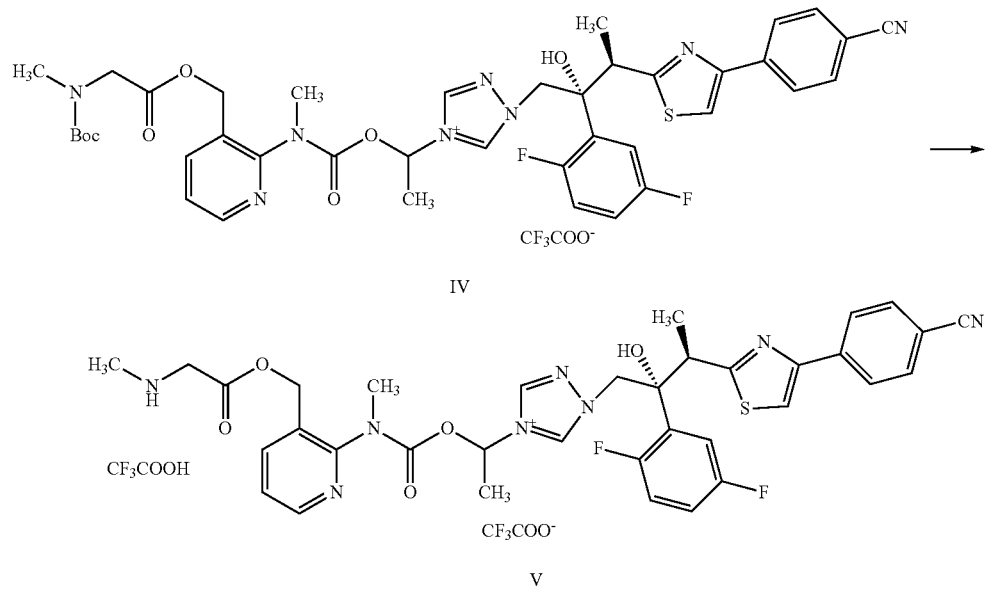

55.7 g (0.06 mol, 1.0 q) compound of formula IV was dissolved in 160 ml of ethyl acetate, 60 ml of acetonitrile was added into the reaction system at the same time, and the temperature was reduced to about 0~5° C., then 246 g (1.8 mol, 30 eq) of 85% trifluoroacetic acid aqueous solution was slowly added dropwise to the system, the temperature will rise during the adding process, and the dropping speed was controlled to maintain the temperature below 10° C. After the completion of dropping, the system was heated to 25~30° C., and stirred while keeping the temperature until the compound of formula IV was completely converted (reaction is completed for 8-10 h). After 160 ml of ethyl acetate was added to dilute the reaction solution, the organic phase was washed with water until the pH of the aqueous phase becomes between 4 and 6, the organic phase was dried over anhydrous sodium sulfate, and concentrated to obtain 52.9 g of compound of formula V (yield: 93.5%; Purity: 95.8%; Iodine ion:<0.1%).

Example 6 Preparation of Isavuconazonium Sulfate

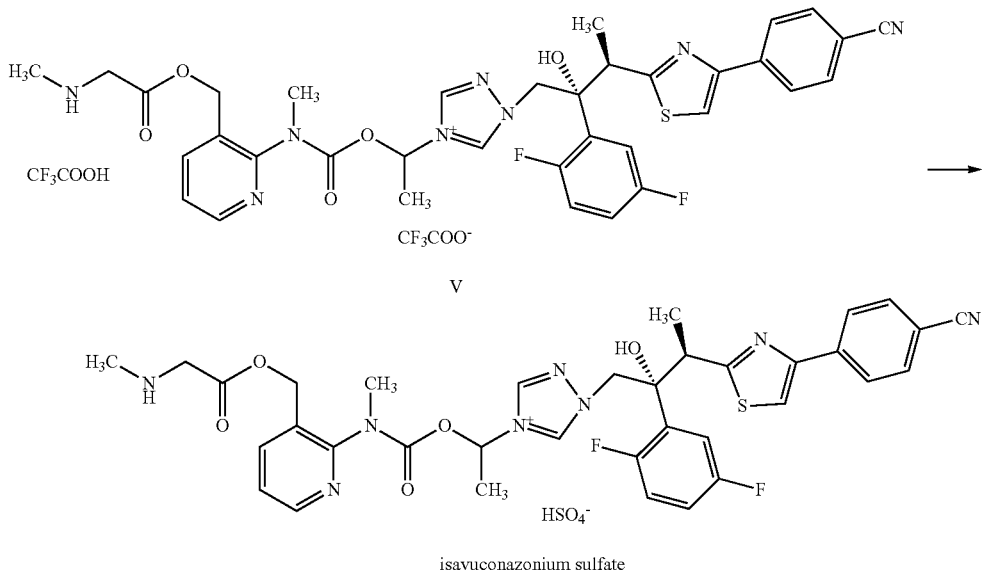

isavuconazonium sulfate 40.0 g (0.04 mol) of compound of formula V was dissolved in 200 ml of dichloromethane solution, then 300 ml of 20 wt % sodium bisulfate aqueous solution (0.5 mol) was added, and stirred at 0~10° C. until the compound V was completely converted (the conversion time was 0.5~1 hour). The mixture was liquid separated and the aqueous phase was extracted with dichloromethane and n-heptane respectively.

The aqueous phase was adsorbed by macroporous resin to remove inorganic small molecule salts, and eluted twice with 200 ml*2 acetone. The eluent was collected and combined, concentrated to remove the organic phase in the eluent, and the remaining aqueous phase after concentration was lyophilized to obtain 31.6 g of isavuconazonium sulfate (91.7% yield, 99.89% purity).

Example 7 Preparation of Isavuconazonium Sulfate

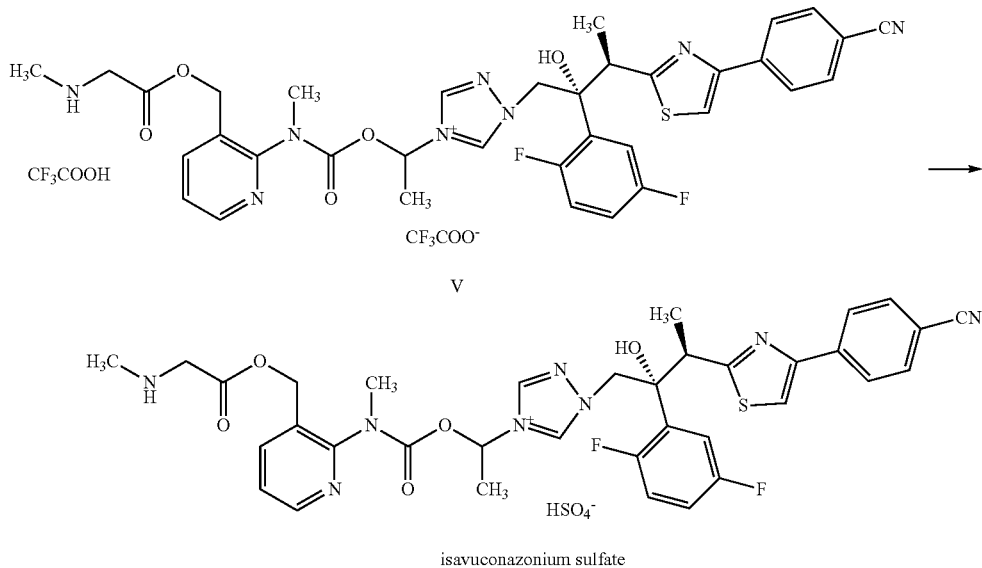

isavuconazonium sulfate 40.0 g (0.04 mol) of compound of formula V was dissolved in 200 ml of ethyl acetate solution, then 300 ml of 20 wt % sodium bisulfate aqueous solution (0.5 mol) was added, and stirred at 0~10° C. until the compound of formula V was completely converted (about 0.5~1 hour). The mixture was liquid separated and the aqueous phase was extracted with ethyl acetate and n-heptane respectively.

The aqueous phase was adsorbed by macroporous resin to remove inorganic small molecule salts, and eluted twice with 200 ml*2 ethyl acetate. The eluent was collected and combined, concentrated to remove the organic phase in the eluent, and the remaining aqueous phase after concentration was lyophilized to obtain 31.1 g of isavuconazonium sulfate (90.2% yield, 99.75% purity).

Example 8 Preparation of Isavuconazonium Sulfate

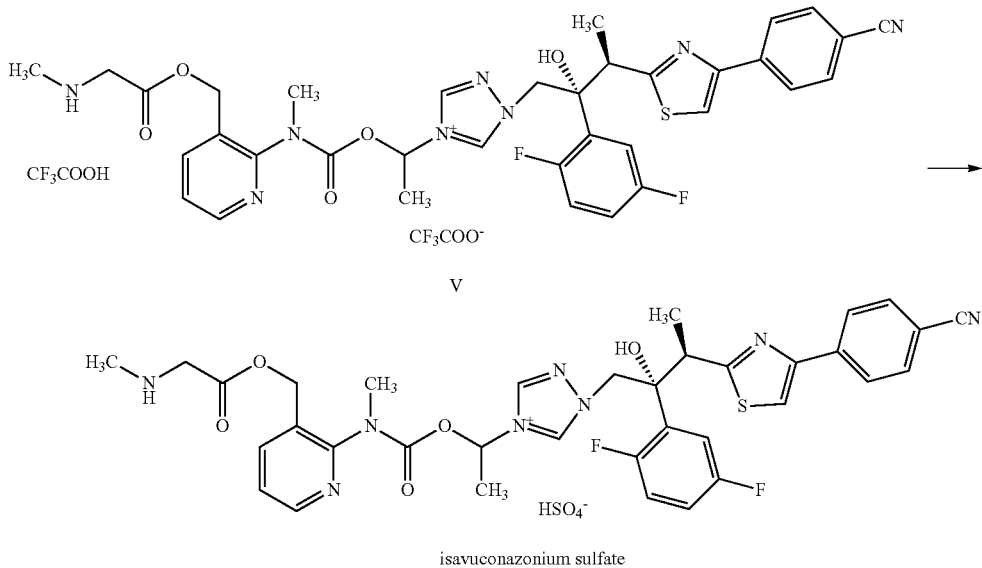

isavuconazonium sulfate 40.0 g (0.04 mol) of compound of formula V was dissolved in 200 ml of isopropyl acetate solution, then 200 ml of 20 wt % sodium sulfate aqueous solution (0.33 mol) was added, and stirred at 0~10° C. until the conversion of compound of formula V was completely converted (the conversion time was 0.5~1 hour). The mixture was liquid separated and the aqueous phase was extracted with isopropyl acetate and n-heptane respectively.

The aqueous phase was adsorbed by macroporous resin to remove inorganic small molecule salts, and eluted twice with 200 ml*2 ethanol. The eluent was collected and combined, concentrated to remove the organic phase in the eluent, and the remaining aqueous phase after concentration was lyophilized to obtain 30.7 g of isavuconazonium sulfate (89.1% yield, 99.2% purity).

All documents mentioned in the present invention are cited as references in this application, just as each document is individually cited as a reference. In addition, it should be understood that, after reading the above teaching content of the present invention, those skilled in the art can make various changes or modifications to the present invention, and these equivalent forms also fall within the scope defined by the appended claims of the present application.

The invention claimed is:

1. A preparation method for preparing isavuconazonium sulfate, wherein the preparation method comprises:
   (i) reacting a compound of formula V in the presence of a compound providing bisulfate ions, thereby obtaining isavuconazonium sulfate of formula VI;

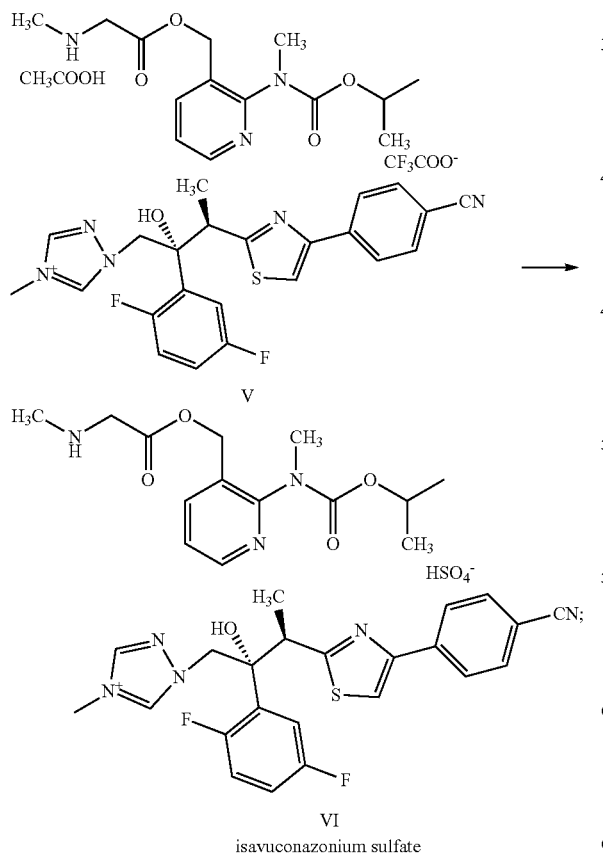

and
   the preparation method further comprises a preparation step of the compound of formula V;
   wherein the preparation step of the compound of formula V includes:

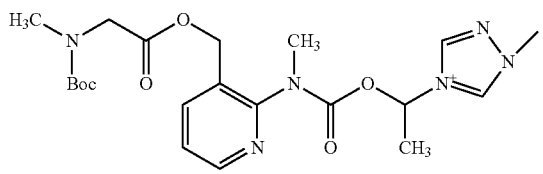

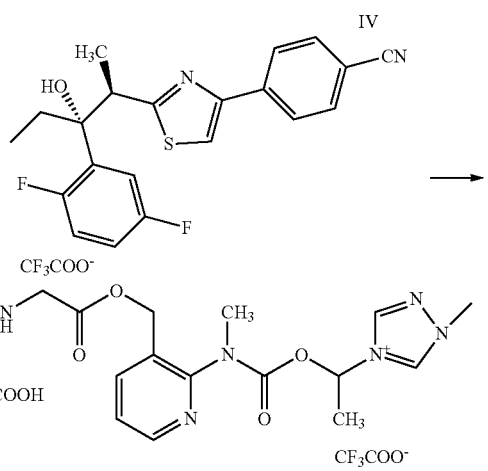

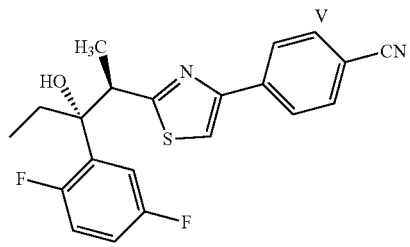

in the presence of tert-butyl ion trapping agent and trifluoroacetic acid, subjecting the compound of formula IV to a deprotection reaction, thereby obtaining a compound of formula V.

2. The preparation method according to claim 1, wherein the reaction of step (i) is carried out in a first mixed solvent, and the first mixed solvent is a mixed solvent consisting of water and a first organic solvent.

3. The preparation method according to claim 2, wherein in the first mixed solvent,
   the first organic solvent is selected from the group consisting of ethyl acetate, isopropyl acetate, dichloromethane, toluene, methyl tert-butyl ether, and combinations thereof; and/or
   the volume ratio of the water to the first organic solvent is (0.5-5):1.

4. The preparation method according to claim 1, wherein
   a. the molar ratio of the bisulfate ion to the compound of formula V is (3-50):1; and/or
   b. the compound providing bisulfate ions is selected from the group consisting of sulfuric acid, bisulfate salt, sulfate salt, and a combination thereof.

5. The preparation method according to claim 1, wherein
the tert-butyl ion trapping agent is selected from the group consisting of acetonitrile, malononitrile, benzonitrile, thiophenol, p-methoxythiophenol, methyl thiophenol, phenol, cresol, anisole, dianisole, thioanisole, dimethyl sulfide, and combinations thereof; and/or
the ratio of volume-molar (ml/mmol) of the tert-butyl ion trapping agent to the compound of formula IV is (0.2-10):1.

6. The preparation method according to claim 1, wherein the preparation method further comprises a preparation step of the compound of formula IV;
wherein, the preparation step of the compound of formula IV includes:

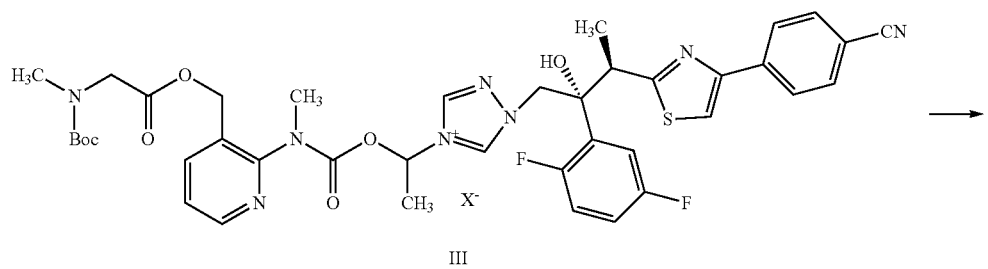

III

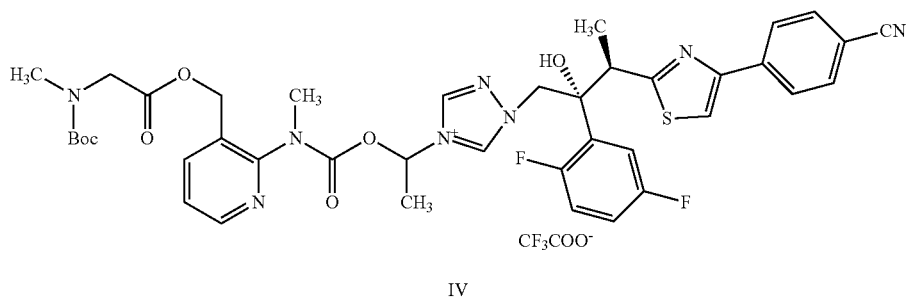

IV in a third mixed solvent, subjecting the compound of formula III and the trifluoroacetate ion to an anion exchange reaction, thereby obtaining the compound of formula IV;
wherein
the third mixed solvent is a mixed solvent consisting of water and a third organic solvent,
X is an anion selected from the group consisting of Cl⁻, I⁻, $HSO_4^-$, $0.5SO_4^{2-}$, and combinations thereof.

7. The method according to claim 6, wherein the trifluoroacetate ion is provided by a compound selected from the group consisting of trifluoroacetic acid, trifluoroacetate salt, and combinations thereof.

8. A method for preparing isavuconazonium sulfate, the method comprising the steps of:
(1) a preparation step of compound of formula IV:
in a third mixed solvent, subjecting the compound of formula III and the trifluoroacetate ion to an anion exchange reaction, thereby obtaining the compound of formula IV;

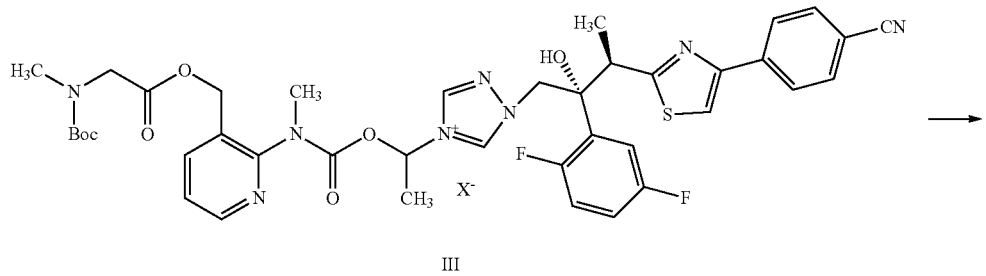

III

-continued

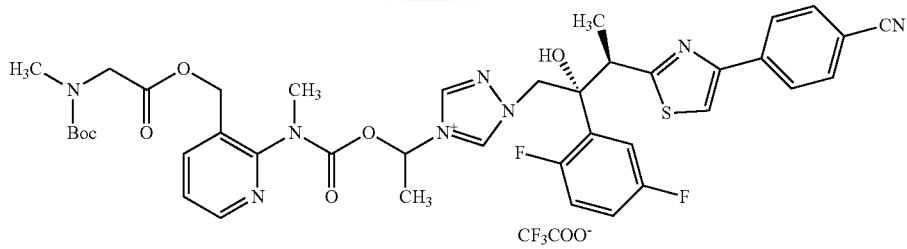

IV wherein
the third mixed solvent is a mixed solvent consisting of water and a third organic solvent,
X is an anion selected from the group consisting of Cl⁻, I⁻, $HSO_4^-$, $0.5SO_4^{2-}$, and combinations thereof;
(2) a preparation step of compound of formula V:

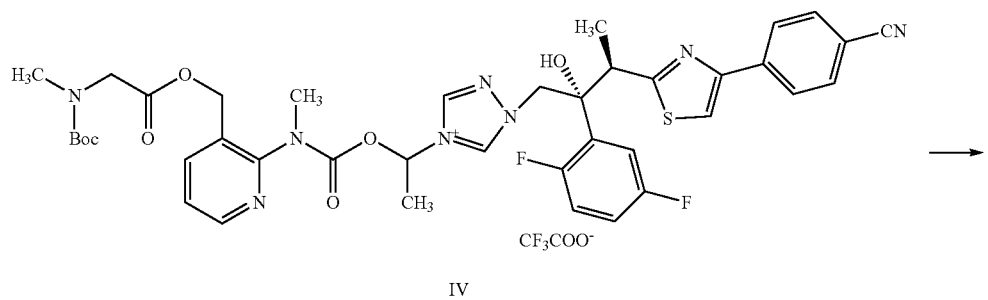

IV

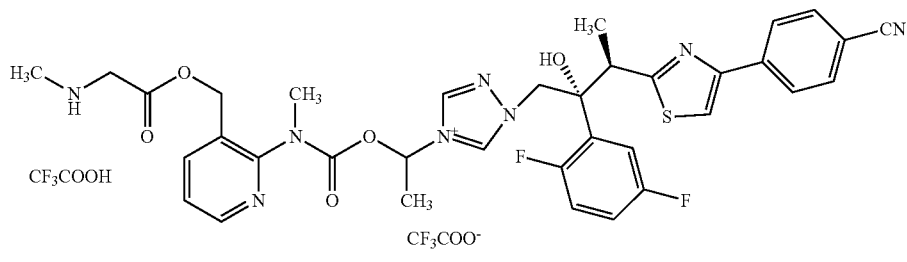

V in the presence of a tert-butyl ion trapping agent and a trifluoroacetic acid, subjecting the compound of formula IV to a deprotection reaction, thereby obtaining a compound of formula V; and
(3) a preparation step of compound of formula VI:

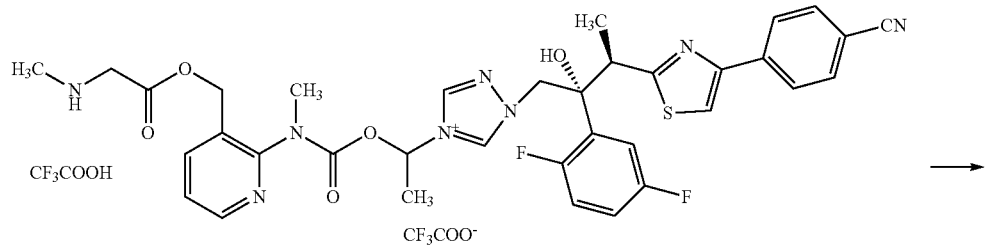

V

-continued

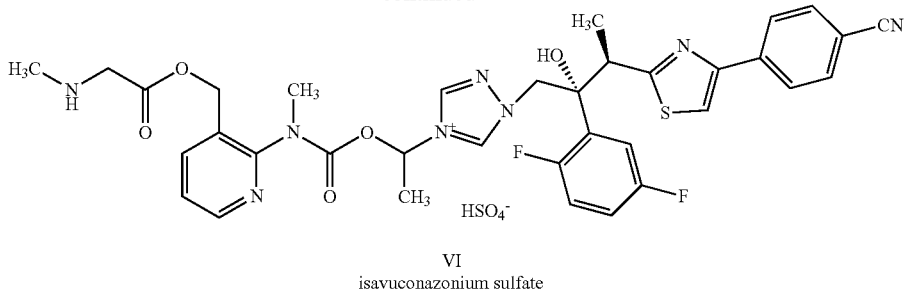

VI
isavuconazonium sulfate reacting a compound of formula V in the presence of a compound providing bisulfate ions, thereby obtaining isavuconazonium sulfate of formula VI.

9. The preparation method according to claim 2, wherein in the first mixed solvent, the volume ratio of the water to the first organic solvent is (0.8-3):1.

10. The preparation method according to claim 2, wherein in the first mixed solvent, the volume ratio of the water to the first organic solvent is (1-2):1.

11. The preparation method according to claim 1, wherein the molar ratio of the bisulfate ion to the compound of formula V is (5-30):1.

12. The preparation method according to claim 1, wherein the molar ratio of the bisulfate ion to the compound of formula V is (10-20):1.

13. The preparation method according to claim 1, wherein the ratio of volume-molar (ml/mmol) of the tert-butyl ion trapping agent to the compound of formula IV is (0.5-8):1.

14. The method according to claim 6, wherein the trifluoroacetate ion is provided by trifluoroacetate salt.

* * * * *